FIG. 1

INVENTOR
JOHN L. MUELLER

INVENTOR
JOHN L. MUELLER

BY Beaman & Beaman

ATTORNEY

United States Patent Office 3,461,938
Patented Aug. 19, 1969

3,461,938
TIRE MOUNTING AND INFLATING SYSTEM
John L. Mueller, Detroit, Mich., assignor to Sparton Corporation, Jackson, Mich., a corporation of Ohio
Filed Mar. 9, 1967, Ser. No. 621,880
Int. Cl. B60c 25/06
U.S. Cl. 157—1.1                        2 Claims

ABSTRACT OF THE DISCLOSURE

A reciprocating system for automatically mounting and inflating random, intermixed sizes of tubeless tires comprising, a wheel loader, bead lubricator, mounting head, inflator, and palletized conveyor interconnecting and transfer means.

BACKGROUND OF THE INVENTION

The invention relates to materials handling equipment, and particularly to high speed fully automated tire mounting and inflating apparatus fully integrated by and including a conveyor system. The requirement for completely automated apparatus to provide for the rapid assembly of tire wheels has established a new level of system design criteria. The problems of inflating tubeless tires has provided an order of difficulty, particularly since prior methods involve inflation through valve stems into a tube which is, of course, not suitable for tubeless tires which rely on the setting of tire beads onto opposed wheel flanges to provide an effective air seal therebetween. It may thus be seen that even a slight gap between the wheel flanges and the tire beads would render the operation ineffective, and this problem is further compounded because of the tire shape and its lack of circular uniformity particularly due to having been tightly bound and disfigured during shipment.

Harrison U.S. Patent Nos. 2,778,388 and 2,900,915, assigned to the assignee of the instant invention, discloses in part a two-pressure stage tire inflation system of simplified electromechanical construction for the automatic mounting and inflating of tires. The instant invention is a departure from the Harrison system design and an improvement thereupon. A common air distribution manifold is no longer employed as in tube type inflators, a superior drive system has been developed, and a more precise mounting sequence has been made possible. The use of individual hoses connected to a plurality of tires reduces significantly the speed which is required of the instant automatic tire mounting system.

Through the instant invention, it has been made possible by employing system integration along with a novel palletized conveyor coupled with a continuous but reciprocating flow of material through several assembly stages, a high speed tire mounting and inflating system which overcomes the deficiencies of the prior art in now providing precise indexing, alignment, and conveying of tires and wheels to provide for an automatic unitized assembly system. While the complexity of the herein described system has been increased, as well as functionally refined, it does not require additional factory floor space. Other benefits of the instant invention include a significant increase in assembly precision, and with a minimum of output rejects.

SUMMARY OF THE INVENTION

It is the purpose of the invention to provide precision materials handling equipment capable of mounting tires and wheels, and automatically inflating such assemblies at high speed. It has been found that significant assembly speeds can be achieved only by employing tire inflation methods which provide for inflating the tire contact wheel perimeter, i.e., the full contact distance between the tire bead and wheel flange at substantially the same time so as to thereby provide for effective air entrapment and effective seal. The employment of apparatus for squeezing and otherwise providing for sealing of the tire bead with the wheel flange have been found ineffective as have other approaches which employ low pressure injection schemes. While some of these methods which provide large air volumes in an attempt to properly set tire beads were suitable in lower speed operations, current requirements for high speed assembly preclude any utilization of designs based on this method.

In the instant system, significant improvements have resulted in an automatic tire-wheel mounting system which provides for the production of more than 600 completed assemblies per hour. This has been made possible by employing higher sealing pressures and improved machine design, but more particularly by the redesign of the mounter conveyor driving system, the conveyor loading system, the soaping apparatus, the tire positioning and mounting assembly, and the inflation mechanism.

After completion of the assembly cycle, the tire mounted wheel may be then transferred to a balancer for weight placing. This equipment includes a turnover assembly which effectively places the wheel curb side down for weight insertion onto the inner flange area, or alternatively for weight placement on opposed flange areas.

It has accordingly been realized that by employing sophisticated system integration design criteria, a wheel and tire mounting system is now in being which satisfies the high speed needs of the automotive industry. In so doing, significant economies of space have been realized, as well as other benefits of highly automated and reliable materials handling equipment. These benefits to the materials handling art will obviously inure beyond the tire-wheel assembly technologies.

Accordingly, the principal object of the present invention is to provide for a materials handling system which includes automated devices for the conveying, assembly and inflation of tire and wheel assemblies.

Another object of the invention is to provide for highly automated tire and wheel positioning devices for automated assembly.

Another object is to provide for highly efficient, reliable electromechanical and pneumatic transport apparatus for handling, inflating and mounting tubeless tires.

A still further object of the invention is to proivde for novel apparatus which enables precision high speed handling of tires and wheels.

These, and other objects of the instant invention, can be more readily understood, and the uniqueness of the tire and wheel assembly system described herein, as well as its manner of construction and use, will be more readily appreciated from the following detailed description, taken in conjunction with the accompanying drawings, forming a part hereof, in which:

DESCRIPTION OF THE PREFERRED EMBODIMENT

The drawings illustrate the basic relationship of the individual stages, their interrelationships, as well as the unitary design of the palletized conveyor system. It may be seen that automatic control means are provided for mounting and inflating tires and for wheel release from such inflating machines which are adapted for automatic operation in conjunction with a continuous conveying system. Essentially this involves the receiving of wheels onto a pallet conveyor which is suitably indexed to identify location, tires are received on the opposed end which are then lubricated in a soaper to be subsequently conveyed to the mounting and inflating station. After mounting and inflating the complete tire-wheel assembly is balanced or directly moved to the output end of the assembly system.

Figure 1:
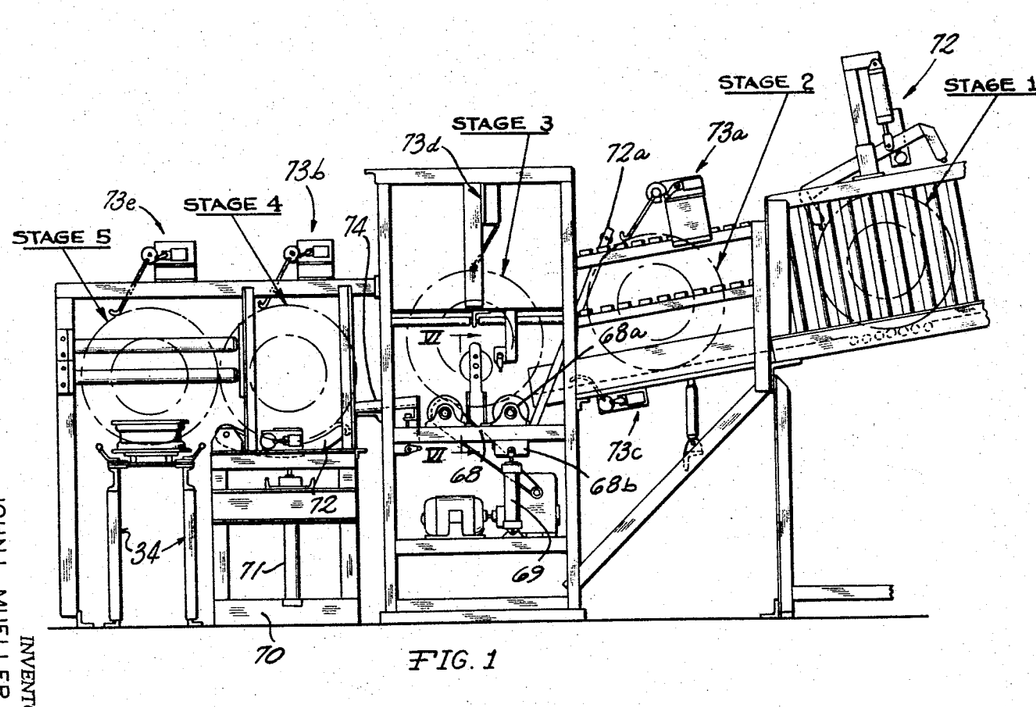
FIGURE 1 is a side elevation view of a portion of the preferred embodiment illustrating the tire delivery apparatus.
Figure 6:
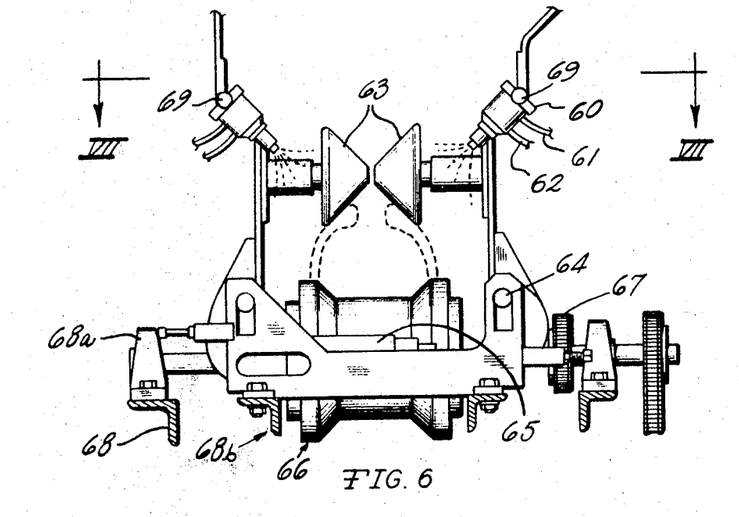
FIGURE 6 illustrates the tire soaping and assembly rotating apparatus.

The tire delivery and mounting apparatus as illustrated in FIG. 1, is a preferred embodiment of the invention, and shows the tire being prepared for mounting by being positioned in Stage 1 by being held onto escapement mechanism 72 which is a standard electropneumatically controlled positioning device having high pressure air supplied to the cylinder. The tire is delivered to Stage 1 through a gravity chute (not shown) which may be manually or mechanically fed depending upon the requirements of the installation and the amount of floor space available in the tire mounting assembly plant area. The tire progresses from Stage 1 to Stage 2 on demand of the soaper, as illustrated in FIG. 6. Escapement means 72 releases the tire from Stage 1 and allows the tire to roll by gravity force to Stage 2 where it is held by a similar second escapement 72a. When the soaper frame 68b has been raised to eject a tire from Stage 3, the tire being positioned in Stage 2 is allowed to roll by gravity feed into the soaper generally identified by Stage 3. Upon arriving in the soaper assembly, it is appropriately detected by limit switch 73d which initiates a programmed timed cycle whereby the bead rollers 63 are brought into engagement with the tire beads.

As shown in FIG. 6, the soap guns 60 are thereupon triggered to apply a coating of soap onto the tire beads. The soap guns 60, upon completion of their soaping cycle, are turned off automatically, and the bead rollers retract. The soaped tire is now ready to be ejected from the soaper assembly through the action of cylinder 69 and appropriately delivered from Stage 3 to Stage 4 by the action of cylinder 69. While in Stage 4, its presence is detected by an arm positioned on the uppermost portion of the frame assembly to provide for limit switch 73b actuation. Until the mounting conveyor is in a position to receive the tire in Stage 4, it is retained thereat until Stage 5 is vacated. At this time, and when a wheel has moved into the provided position, the limit switches signal the action of cylinder 71 to raise the ejector 72 thereby interposing the tire in front of the rim as indicated at Stage 5. At this point the cycle repeats itself, although other portions of the cycle are normally taking place concurrently with the preceding. In other words, during high speed operation of the tire mounting equipment each stage is normally filled. As soon as one station is vacated a tire is demanded from the preceding stage providing there is a tire at each position at such times. This sequence of tire positioning in the respective five stages is controlled through a series of limit switches attached to the tire mounter to accomplish the following:

When a wheel is presented in front of the soaper, a tire resting in ejector 72 is caused to be placed in front of said wheel. Should there be a wheel lacking on the pallet, the tire on ejector 72 does not move since the absence of the wheel is sensed by the limit switch. If there is no tire present in ejector 72, when a wheel is presented in Stage 5 on the mounting machine, the mounting machine will automatically shut down and await a tire on ejector 72. It is thereby possible to preclude the passing of empty wheels or tires without wheels, through the machine.

Figure 7:
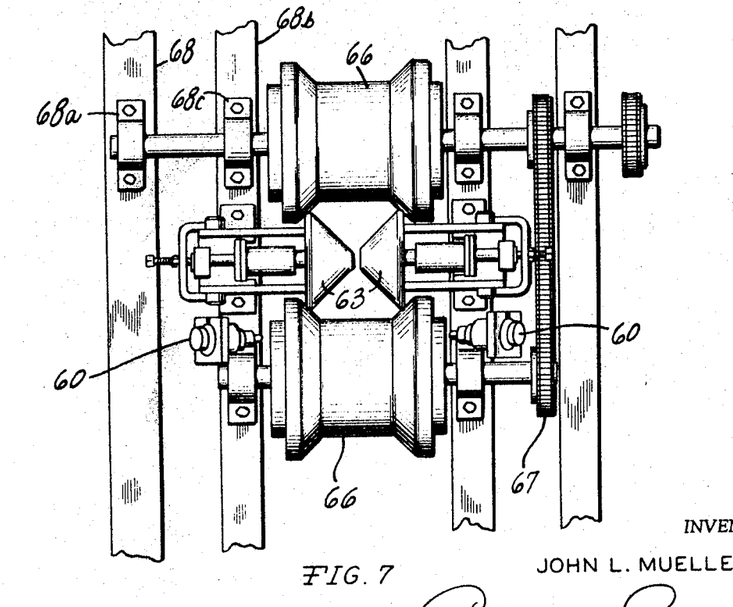
FIGURE 7 is an enlarged top plan view taken along line VII—VII of FIG. 6 showing details of the bead rolls and tire rotating apparatus.

In FIG. 6 there is illustrated a cross section and plan view of the internal construction of the soaping and tire lubricating assembly. A liquid soap solution is provided for application onto the internal tire beads, by means of sprayers 60, to function as a lubricant during subsequent physical joining between the rim surface and the tire beads. The spray guns 60 are of the so-called airless type in which the liquid soap solution is applied through pressure and a nozzle configuration which provides for fine droplets. These guns 60 do not provide for atomization, although the soap solution impinging upon the complete bead surface, is under high pressure. The air used by the guns is simply a triggering mechanism to permit the liquid material to flow, or to be turned off at the end of the programmed cycle. The guns 60 are fastened to a stationary framework and are secured to a pivot mounting 69 for manual adjustment to secure optimum directional spraying. The rollers 63 are pivotally mounted on pins 64, and actuated by an air cylinder 65, shown in FIG. 6. Rollers 63 confine the tire beads to an area which is selectively provided to be covered by the guns 60 spray pattern. During this operation the tire is supported by rollers 66 which have tapered adjustable flanges that may be appropriately set to accommodate a specific range of tire sizes. These rollers are operated and turned by a chain drive 67 which is powered by an electric motor through a speed reducer. The rollers 66 are turned at a speed equivalent to generating one revolution of the tire each second. This entire roller assembly is supported in bearings 68a, which are supported in frame 68, constituting a part of the main soaper frame. Frame 68 also supports the rollers through bearings 68a. Subframe 68b, which may be raised and lowered by air cylinder 69 in order to eject the soaped tire from the soaping machine, is bolted to bearings 68c in FIG. 7. A tire ejected from the soaping machine by action of the air cylinder 69 rolls to the loader position represented in FIG. 1 and shown as situated at Stage 4 in a waiting position for mounting, at 70. In this position, the tire waits until the mounting machine is ready for further processing. At the start of a cycle, a series of limit switches and solenoid valves place the tire from Stage 4 in front of the rim by the action of air cylinder 71 lifting loader frame 72 and interposing the tire in front of the rim on the mounting machine shown as mounting conveyor frame 34. In FIG. 1, the loader subassembly 72 provides for appropriate conveyance of the tire onto the mounting conveyor pallet shown at Stage 5 and supported on frame 34. Limit switch assembly 73b senses the presence of a tire as it is made available to the mounting assembly for insertion into Stage 5.

Figures 2, 2A:
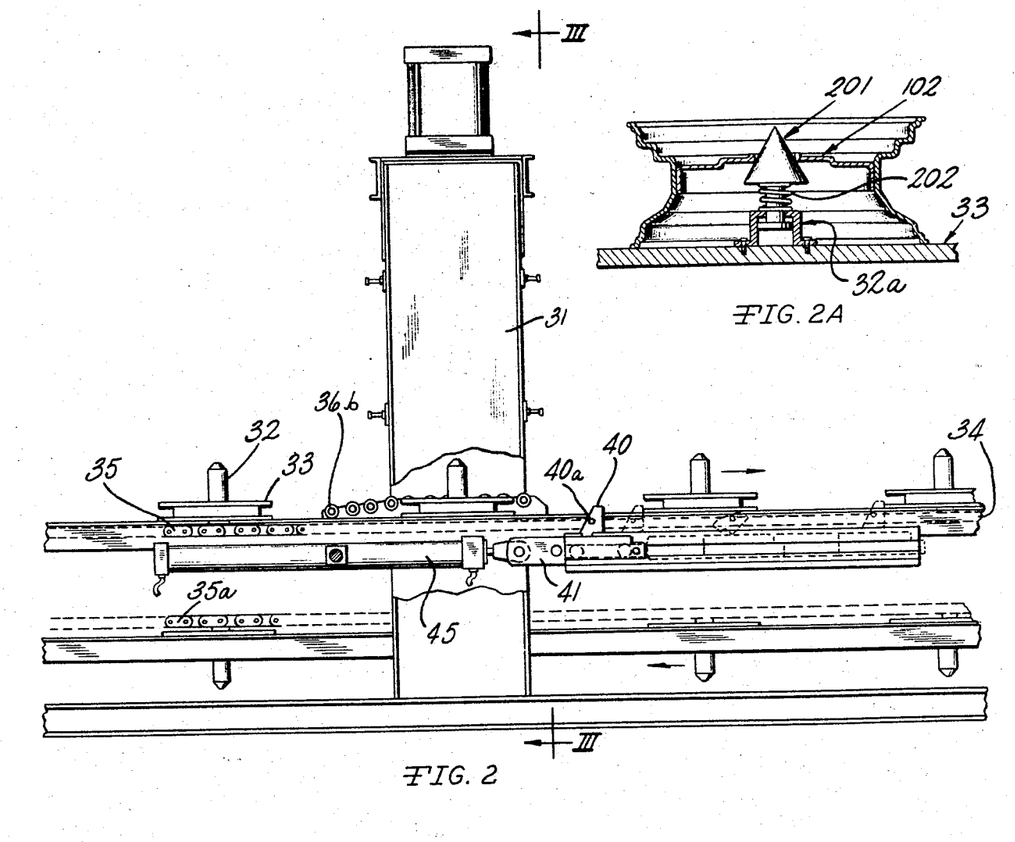
FIGURE 2 is a fragmentary side view of the pallet conveyor having a partial section illustrating the lower portion of the inflator and conveyor driving means.
FIG. 2a shows pilot device.

In FIG. 2 the center line of the pallet which holds the wheel and tire assembly can be very precisely controlled so as to stop in substantial alignment with the center line of the inflator frame. This enables very rapid tire inflating and enables the employment of close tolerance assemblies making high speed inflating possible. The inflator frame 31 illustrates the position of the A-frame surrounding the entire assembly. Dog 40 provides forward movement to pallet 33, and is powered by a hydraulic cylinder 45 and common industrial power package. In FIG. 2 there is also illustrated the inversion of the pallets as they return after ejecting the completed tire wheel assembly. 35a shows an inverted pallet being supported within a suitable double frame.

Also shown in FIG. 1 is a drive unit 69 powered by an electric motor coupled with speed reducer and providing driving motion through a series of sprockets and chains.

Figure 3:
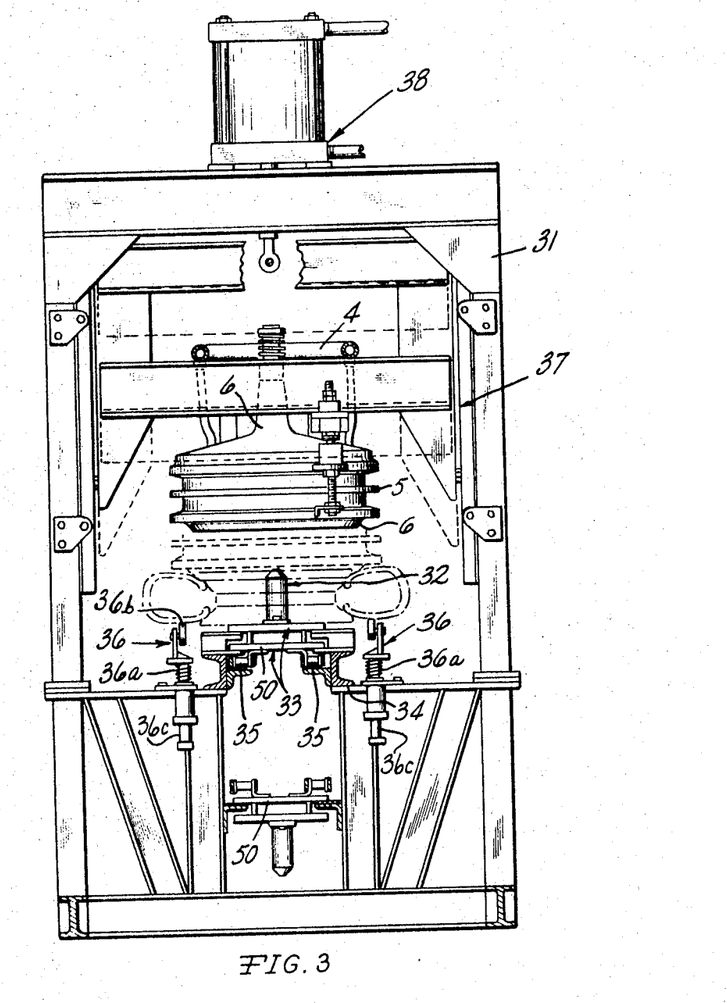
FIGURE 3 represents an elevation end view taken along the line III—III of FIG. 2 showing the tire inflating apparatus from a closeup operating position.

In FIG. 2 and FIG. 3 is illustrated the pallet supporting and positioning means 33 upon which the wheel is positioned over conical stem 32 so as to provide for perfect alignment thereof, the pallet being driven by a reciprocating motion through hydraulic cylinder 45. This reciprocating motion could also be produced by a mechanical crank, pneumatically, or through a system of cams or lead screw devices. Earlier designs for tire inflating machines delivered the tire and wheel assembly on a nonindexing continuously moving conveyor. The tire and wheel assembly arriving at the inflator in motion on the previous continuously moving conveyor had to be stopped, accurately centered and positioned within the inflator head and then raised into the head for proper inflation. In contradistinction to the prior art design, the tire and wheel are accurately positioned and made available to the inflator while firmly fixed on the mounting machine pallet and accurately centered by the pallet post 32. The reciprocating nature of the machine, coupled with the known and fixed length of stroke provided by the hydraulic cylinder 45, it is now possible to adjust precisely the travel of dog 40 so that each pallet is driven to a known and fixed position under the inflator, thereby relieving the necessity of accurately centering a wheel and tire assembly that has arrived on the moving conveyor. The number of crushed rims and simply improperly inflated tires has been reduced considerably. In the instant system, the tire and wheel assembly is provided at the inflator, motion is stopped, in an accurate and predetermined position on a repetitive cycle basis, thereby minimizing the danger of wheel damage that has been a vexing industrial problem in the past due to inaccurately centered wheel assemblies. Since the wheel rim must be held against the inflator seal 2 by a force in excess of 10,000 lbs., it is quite obvious that a mispositioned wheel, once inaccurately centered, would be crushed by these forces if they were not applied as in the instant case through the concentric rubber seal 2, shown in FIG. 5.

In the earlier designs, the wheel and tire assembly were carried through the mounting head only on a pallet and placed on the moving conveyor that carried them to an inflator. In the instant system, the tire and wheel do not leave the post 32 and pallet 33 assembly. They are conveyed through the mounting head located after Stage 5 on the same conveying and positioning means. Illustrated in FIG. 2a is an invention embodiment showing a conical, spring 202 loaded, pilot device 201 applied to each pallet post 32a so as to provide for using wheels 102 on the pallet system with differing diameters or heights of hub hole. In this way, the varying widths and heights can be accommodated with precise positioning into the inflator assembly. By the use of precise positioning of the pallet 33 and post 32a, coupled with the reciprocating motion of the machine, the wheels may be indexed to a precise point under the inflator and held in precise alignment within the inflator while the air inflation proceeds. Older designs did not provide such precision alignment, indexing and conveying; and wheels were sometimes misaligned resulting in crushed rims and damaged equipment, notwithstanding improper inflation.

As shown in FIG. 2, the pallets 33 are mounted so as to ride upon conveyor frame 34 being transferred from various stages by pushing dogs 40 designed to engage the rear edge of pallets 33. The dogs 40 appropriately propel the individual pallets 33 and interconnecting driving chain 35. The conveyor and pallet driving mechanism is illustrated in FIG. 2, showing the frame providing support for pallets 33. Also shown in FIG. 3 is the return means 50 providing support for the pallets to return to the upside position for transfer of tire wheel assemblies. Also shown in FIG. 3 is a level lifting device 36 provided to hold the tires in a substantially level position during the inflation process, with moving frame 37 being provided to hold the moving head. Coil springs 36a being provided so as to maintain alignment thereupon. These coil springs also provide for stabilization and expansion of the tire by being compressed as the tire is inflated in the head, compression of the springs 36a being provided by downward movement of leveling assembly 36 upon which are mounted rollers which retreat during inflation of the tire, as shown in FIG. 3. The rollers 36b provide for movement of the assembly during indexing of the conveyor. The rollers are appropriately guided by a post 36c running through a long bearing to keep it stabilized and to prevent cocking. The entire assembly being provided with a collar to fix the roller assembly relative to pallet 33 in height. The pallets mounted upon frame 34 are supported thereupon and pushed forward by dogs 40. Carriage 41 provides direct connection to cylinder 45.

Forward movement of the assembly on the carriage is provided by hydraulic cylinder 45 through dogs 40. The pallets 33 being permanently secured to the two chains 35 on respective sides of conveyor frame 31. In returning, the pallets are carried along the upper surface of the bottom portion of the pallet as shown in FIG. 3. The pusher dog for propelling the pallets consists of a carriage supported by four cam followers, and guided by four additional cam followers in a lateral position. The pusher dog is carried forward, while being supported in upright position by springs and counterweight, and is allowed to pivot about a suitable pin 40a, thereby enabling the dog to travel beneath pallets 33 to function as a unidirectional clutch as illustrated by dotted lines in FIG. 2. The body of the pusher dog carriage is contained in the track as shown in FIG. 2 beneath frame 34.

The power supplied to the system is provided through hydraulic cylinder 45 which obtains its power from a standard industrial hydraulic power package including an electric motor and a suitable high volume hydraulic pump. The motor power for the vertical motion of frame 37 is contained in cylinder 38 which is pneumatically or hydraulically powered. Cylinder 38 is rigidly mounted on stationery frame 31 and flexibly connected to frame 37 by utilizing a standard clevis connection.

Figure 4:
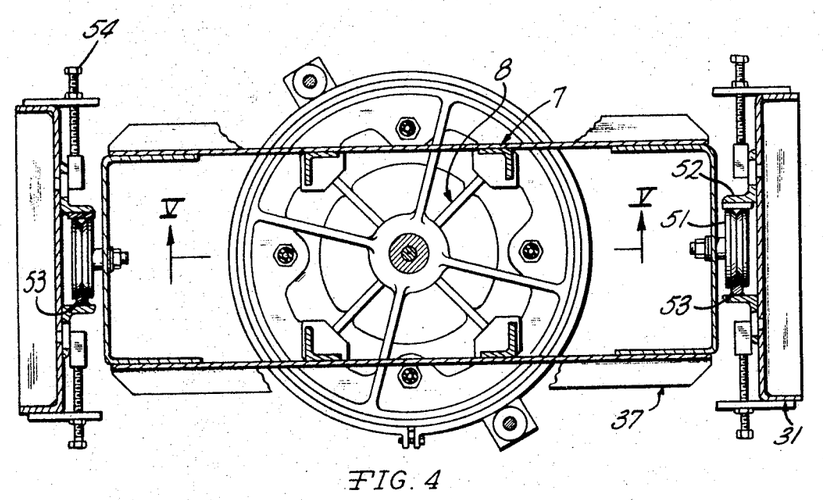
FIGURE 4 is an enlarged fragmentary partially sectioned top plan view of the inflating apparatus.
Figure 5:
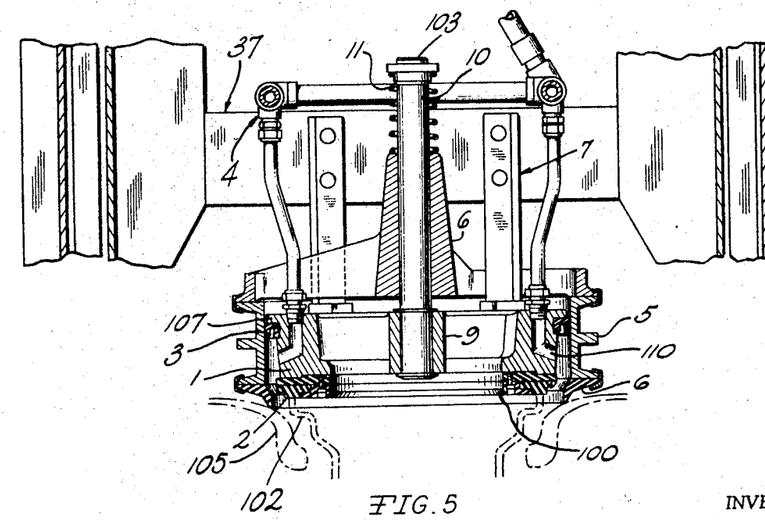
FIGURE 5 is an enlarged fragmentary side view, partially sectioned, taken along V—V of FIG. 4, to show the tire bear-wheel flange mating surfaces in the inflating apparatus.

As illustrated in FIG. 4 and FIG. 5, which show the tubeless tire inflating device in detailed construction, it will be seen that there is provided a retainer 100 which supports the wheel sealing mechanism 2 which is adapted to engage the inner flange of a wheel 102 and to seal same against air pressure introduced through ports 110.

The piston and cylinder assembly 1 and 5, having a partially compressed spring 11, create downward pressure so as to positively engage the side wall of tire 105 with sealing ring 6. Centralization of the piston and cylinder assembly is provided through hub 9 and post 10, functioning as a guide post. An annular resilient sealing ring 2 is provided to intimately engage rim 102 of a wheel which is placed in contact therewith and an annular U-rubber cup 3 is adapted to provide an air seal between the piston 1 and the interface of a cylindrical portion 5. At the lower end of the cylinder 5, a relatively thin edge annular ring 6 is clamped in fixed relationship thereto. The weight of the cylinder assembly provides forces which in addition to compressed spring 11 causes the lower edge of ring 6 to depress the side wall of the tire 105 to a position shown in FIG. 5, the relatively thin edge 6 forming an air seal with the tire side wall to define a closed air chamber within the tire communicating beyond the tire bead with the annular chamber between the cylinder 5 and the piston 1, with said later chamber being sealed from the outside by cup seal 3 and wheel seal 2, respectively. The air pressure may now be introduced through inlet port 110, so as to provide pressure acting on the tire wall area extending radially beyond the contact edge 6 to overcome the weight of the cylinder 5 assembly, raising cylinder assembly 5 until the tire bead establishes sealing contact with the wheel preventing additional air flow to the inside of the tire. It may thus be seen that although the last movement of the tire side wall from the initial sealing point to the final sealing position will increase the volume within the tire, and correspondingly decrease the pressure, which nevertheless provides through air pressure the establishment with the tire a seal sufficiently strong that the required tire pressure to compensate for the increased volume upon final bead seating will be adequate to effect full inflation of the tire to the desired air pressure. This device for introducing air under pressure into a rim mounted tubeless tire makes possible rapid inflation by utilizing an annular sealing ring 2 which engages directly a wheel rim, and a substantially rigid cylinder 5, coupled with a second annular sealing ring 6 which is provided to engage the adjacent side wall of a tubeless tire. This combination provides for an inflation chamber with air inlet means 110 being provided to create a superatmospheric pressure in the so provided chamber with the cylinder 5 axially moveable with respect to the rim seal 2 so as to hold the side wall bead out of engagement with the wheel rim and also to permit air pressure to flow to the inside of the tire 105.

A carriage is provided for the inflating device which enables the machine to handle an intermittent flow of wheels mounted on pallets 33 to and from the tire inflator as illustrated in FIGS. 2 and 3. Power transferred from dog 40 to the wheel tire assemblies is provided by means of chains 35 and cylinder 45 which in turn provide for proper positioning of the wheels into inflation stations FIG. 5. Pressure switch means are provided to sense the resistance of wheel engagement with the sealing ring 2 to actuate a solenoid valve admitting pressure through the manifold 4 leading to the inflation port 110. Additional limit switches are provided to be cam engageable to control the travel of the pallets 33 and movement thereof on the main frame 34. As indicated above, limit switches are provided to be engaged by the wheels when they are in position while being supported by pallets 33 and electropneumatic controls to signal (1) the completion of the inflation cycle and (2) to cause forward movement of dog 40 to the next position. At the end of the line, provision is made for gravity or powered rolloff of the completely mounted and inflated tire-wheel assembly into a gravity chute, or other conveyance, with return of the pallets 33 to starting position being shown in FIGS. 2 and 3.

OPERATION

The general operating characteristics of the novel apparatus involve the feeding of wheels to the wheel loader through a gravity-roll conveyor, and the initial positioning of wheels onto the wheel loader is provided through an escapement mechanism which is driven by the mounter conveyor drive. Sensors are provided to control precise placement with disengaging mechanisms being provided to stop the conveyor in cases where improper alignment has been made.

Simultaneously therewith, the soaping mechanism will have been provided with a tire, the soaping process will be completed, as the wheels are being transferred along the tire loader whereby the tire is loosely ejected adjacent to the mating rim.

The tire casing, riding loosely on the leading edge of the rim, is transferred to the mounting shoes where they are joined and mounted.

The mounted tire is subsequently transferred to the inflator where inflation is completed and the tire-wheel assembly is conveyed to a balancer for weight placing.

Subsystems

Wheels are fed to the wheel loader via a roll system. An escapement mechanism, driven by the mounter conveyor drive, allows only one wheel to pass onto the wheel loader at a time. The wheel loader dogs then push the wheel onto a pallet for transfer to the tire loader. The process is intermittent and is completely synchronized with the conveyor pallets. Should a wheel not be placed properly, a limit will be tripped, stopping the conveyor to prevent damage to the equipment.

As the wheels are being transferred, the soaper will have accepted a tire and completed the soaping process. The tire is then transferred into the tire loader to await a wheel rim. When the wheel approaches the tire loader, tripping a series of limit switches, the tire will be ejected adjacent to the rim. This process, as with all others, is intermittent, rapid, and proceeds in conjunction with the other herein disclosed operations.

With the tire now placed on the leading edge of the rim, the assembly transfers to the mounting head. At this point, the tire is mounted by the action of the mounting shoes.

The mounted tire then transfers to the conveyor and under the inflation head. A large volume of air is pressed into the tire by passing between the rim and tire bead. The apparatus making possible the automatic inflation comprises providing annular air seals which include the lower tire beads against the wheel flange, as well as a seal between a weighted cylinder and the opposed tire casing and suitable seals between the wheel rim and the inflating mechanism to thereby define a completely enclosed air chamber which communicates also with the interior of the tire through the entire annular opening between the wheel flange and tire bead. The large air volume exerts an air pressure as it is introduced within the provided chamber and provides for equal pressure on both sides of the tire casing within the tire periphery, and is opposed only by atmospheric pressures thereby making possible initial inflation forcing the tire bead into sealing contact with the wheel flange. Through balancing of the internal cylindrical area and the contact edge position relative to the side wall extremities, it is now possible to provide an adequate pressure within the tire to enable a sealing contact of a sufficient magnitude that the subsequent pressure release on the exterior side wall portions does not reduce the accuracy nor final position of the upper bead seat against the wheel flange, which thereby provides a fully inflated tire. Pressures during this operation are accurately controlled by pressure-to-electric switches.

From the above description of the various system parts, the construction and operation of the herein disclosed tire-wheel mounting system can be readily understood by those skilled in the art. Additional insight into the novel features in the instant system can be secured by considering the following operational details of the respective system segments.

Electrical equipment

Machine control is accomplished through a series of limit switches, and magnetic circuitry, along with static circuitry. The assembly system is completely interlocked and means are incorporated to shut down the equipment should a fault occur. Damage to machine and parts has been eliminated thereby and increased machine operating speeds made possible.

Mounter and inflator conveyor

The mounter and inflator conveyor is designed to transfer the rim from the wheel loader to the tire loader, and then transfers the wheel and tire assembly through the mounting head and the inflators. This is accomplished through the use of a hydraulic system which gives a shuttle action to the conveyor.

A specific example of conveyor operating characteristics involves the following: With the selector switch placed in the "auto" position, the hydraulic cylinder will continue to shuttle the conveyor unless one of the following conditions should occur.

Faults (1) *Conveyor overload,* as indicated by a timer.—
  (a) When the cylinder does not reach its full forward limit switch in a given length of time, a relay will be energized stopping the conveyor. A pilot light will actuate and a horn will sound indicating an overload condition. The condition must first be rectified and then the reset button depressed to restart the conveyor in automatic drive.

(2) *Wheel out of position on pallet,* as indicated by a suitable switch.—
  (a) The cylinder will complete its stroke but will not start another until reset is made at the wheel out of position limit switch. Reset may be made when the wheel is properly positioned, and suitable for continuance.

(3) *Incomplete inflation,* as indicated by timer.—
  (a) Should an incomplete inflation occur, the conveyor will not shuttle forward again until the reset button is pressed. This prevents a tire which is not inflated from entering the system.
  (b) Indication is made by a timer which is set slightly longer than the time needed for inflation, about 4 seconds.

Under conditions of "normal stops" in the system:

(4) *Either one of the inflation heads not full up,* as indicated by limit switches.—
  (a) Should this condition occur, the conveyor will stop.

(5) *Wheel at tire loader but no tire.—*
  (a) The conveyor will not shuttle unless a tire has been loaded on the wheel as indicated by a limit switch.

(6) *Tire assembly at end of conveyor but discharge conveyor not running.—*
  (a) Mounter conveyor will not start next cycle until discharge conveyor is running. This prevents the stacking of tires on the discharge conveyor and thereby precludes jamming.

Manual

With the selector switch in manual, the drive functions are initiated by pushbutton. When the jog buttons are used, the pallet will run full forward (under the inflator) before placing in automatic. To jog the conveyor in reverse, the pin is inserted in the carriage and inched slowly. This operation is necessary only in the event of a jam.

Drive system

The drive system may consist of a Racine variable volume pump and associated valving. Pump pressure is set to about 200 p.s.i. to maintain the time cycle needed for maximum production. The main valve is closed center, 3 position, double solenoid Racine directional control valve. This valve controls the 4" bore hydraulic cylinder which is the driving force for the conveyor. Two cylinders have been used in the system, one as a main driver and the second as a standby driver. Switching from "Main" to "Standby" is accomplished by shutoff valves located at the valve manifold. When changing cylinders, the clevis pin is removed and the carriage joined to the proper cylinder by reinserting the pin.

Soaper and loader

The purpose of the soaper-loader combination is to accept a tire from a tire delivery system, apply soap to the tire bead, and eject the tire onto a rim for mounting and inflation. These operations are accomplished through the use of magnetic circuitry.

It can be readily seen from the above specific embodiment and detailed description that the automatic conveyor feed drive system, as well as its associated parts, is extremely important to secure precise position of the rims in respective stations so as to reduce faults in the machine and broken rims. The indexing mechanism cooperates with the reciprocating drive to precisely position the rim during transit and mounting of the tire thereupon. Throughout the entire mounting sequence, the pallet continues to support and position the wheel as well as subsequently transfer the mounted wheel and tire to the inflator, and finally off the end of the conveyor system to a balancer or a receiving chute. The precise location of any particular wheel or tire is known, thus reducing errors in mismatching of sizes which further enhances high speed operation.

It is therefore obvious to those skilled in the art that modifications of the inventive concept hereof can be made without departing from the basic content and invention hereof. It may also be seen that the objects set forth hereinabove, among those made apparent from the detailed drawings and description hereof, are sufficiently realized, and since certain changes may be made in the above construction without departing from the concept and scope hereof, it is intended that all matter contained in the aforegoing drawings and description shall be interpreted as illustrative and not in a limiting sense.

The invention claimed is:

1. A high speed, unitized tire mounting and inflating system comprising, in combination:
  (a) tire support and transfer means;
  (b) wheel support and transfer means;
  (c) conveyor means cooperating with said wheel and tire support and transfer means to receive positioned wheels and tires;
  (d) soaping means including spray nozzles adapted to feed pressurized lubricant onto rotating tire beads;
  (e) mounting means adapted to automatically assemble tires onto adjacently positioned wheels;
  (f) inflator means adapted to feed pressurized air between tires mounted on said wheels and said wheels;
  (g) discharge means adapted to receive inflated tire assemblies; and
  (h) electrical sensing and control means adapted to precisely control the positioning, mounting and inflating of wheels and tires during the assembly thereof;

2. A unitized tire mounting and inflating system comprising, in combination:
  (a) a main frame, having a substantially horizontal axis;
  (b) wheel loading means including power drive;
  (c) pallet wheel-receiving and support means;
  (d) wheel escapement loading means providing wheel placement upon said pallet;
  (e) an electrical circuit including limit switch sensing means, said sensing means adapted to detect improper placement of said wheel onto said pallet;
  (f) a power conveyor adapted to transfer and support said pallet means;
  (g) a power dog adapted to engage and propel said pallet along said main frame horizontal axis;
  (h) tire loading and receiving means;
  (i) tire support means including bead rollers in cooperative alignment with tire rotating means, said bead rollers being adjustably mounted and adapted to engage and position a tire supported on said support means;
  (j) bead roller means adapted to engagingly stabilize a tire on said support means;
  (k) a tire lubricant sprayer, said sprayer including a nozzle positioned adjacent said bead rollers and axially directed thereat;
  (l) escapement means adapted to disengage said bead rollers and provide for tire transfer to tire loading means located adjacent said tire lubricant sprayer;
  (m) electrical switch sensing and release means, said switch means adapted to engage tire ejection means effecting tire placement upon an adjacently positioned rim;

(n) tire mounting means including a mounting head assembly, with cooperating clutch mechanism and cam roller actuated mounting shoes adapted to engage and open tire beads and effect tire mounting over said rim;

(o) tire inflating means including bead assembly, seal ring means adapted to disengage said tire from said rim defining a cavity therein, and an air passage thereto, means for introducing air into said cavity through said passageway, and means for releasing said bead depressing means when inflation is complete;

(p) conveyor means including pallets adapted to support and position said rims, said pallets being precisely spaced along said main frame;

(q) spaced dog means slidably mounted on said main frame, said dog means adapted to move said pallets along frame to said rim loader and mounting assembly;

(r) power drive means interconnecting said dog means;

(s) reciprocating power means coupled to said power drive means providing movement along the longitudinal axis thereof;

(t) synchronizing switch means controlling the cycling of said power means; and (u) unidirectional clutch means cooperating with said synchronizing switch means engaging said power means enabling unidirectional movement thereof and precise positioning of pallets in said system.

References Cited

UNITED STATES PATENTS 2,900,015  8/1959  Harrison ___________ 157—1.1

FOREIGN PATENTS 814,172  6/1959  Great Britain.

THERON E. CONDON, Primary Examiner

E. F. DESMOND, Assistant Examiner